(12) United States Patent
Kwa et al.

(10) Patent No.: US 10,665,210 B2
(45) Date of Patent: May 26, 2020

(54) EXTENDING ASYNCHRONOUS FRAME UPDATES WITH FULL FRAME AND PARTIAL FRAME NOTIFICATIONS

(71) Applicant: INTEL CORPORATION, Santa Clara, CA (US)

(72) Inventors: Seh Kwa, Saratoga, CA (US); Nausheen Ansari, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/858,025

(22) Filed: Dec. 29, 2017

(65) Prior Publication Data

US 2019/0043458 A1 Feb. 7, 2019

(51) Int. Cl.
| | |
|---|---|
| *G09G 5/393* | (2006.01) |
| *G09G 5/00* | (2006.01) |
| *G09G 5/36* | (2006.01) |
| *G09G 5/395* | (2006.01) |
| *G06F 3/14* | (2006.01) |

(52) U.S. Cl.
CPC ........... *G09G 5/393* (2013.01); *G06F 3/1415* (2013.01); *G09G 5/006* (2013.01); *G09G 5/363* (2013.01); *G09G 5/395* (2013.01); *G09G 2310/04* (2013.01); *G09G 2330/021* (2013.01); *G09G 2360/12* (2013.01); *G09G 2360/18* (2013.01); *G09G 2370/04* (2013.01)

(58) Field of Classification Search
CPC .... G09G 5/393; G09G 5/006; G09G 2360/12; G09G 2360/18
See application file for complete search history.

(56) References Cited

U.S. PATENT DOCUMENTS

| | | | | |
|---|---|---|---|---|
| 8,749,568 | B2* | 6/2014 | Bratt | G09G 5/363 345/545 |
| 2008/0152223 | A1* | 6/2008 | Maeda | G06T 5/40 382/168 |
| 2008/0175559 | A1* | 7/2008 | Jung | H04N 5/76 386/241 |
| 2011/0157202 | A1* | 6/2011 | Kwa | G09G 5/395 345/547 |
| 2011/0285761 | A1* | 11/2011 | Yu | H04N 13/398 345/691 |
| 2012/0075188 | A1* | 3/2012 | Kwa | G09G 3/2096 345/168 |

(Continued)

FOREIGN PATENT DOCUMENTS

JP 2003-349862 * 4/2003

OTHER PUBLICATIONS

Fernando, R. ed., 2004. GPU gems: programming techniques, tips, and tricks for real-time graphics (vol. 590). Reading: Addison-Wesley, Chapter 27 (2004).*

*Primary Examiner* — Sarah Lhymn (57) ABSTRACT

Disclosed herein are techniques to provide notification of the type and/or attributes of frame updates. A platform can notify a panel of further frame updates, whether the frame update is a full frame update or a partial frame update and attributes of the frame update. The platform can notify the panel of information about the frame update during a vertical blanking interval by asserting a command or signaling the panel using selected symbols during the vertical blanking interval.

15 Claims, 9 Drawing Sheets

(56) References Cited

U.S. PATENT DOCUMENTS

| | | | |
|---|---|---|---|
| 2014/0104286 A1* | 4/2014 | Kwa | G09G 3/3611 345/520 |
| 2014/0218378 A1* | 8/2014 | Roh | G06T 1/60 345/519 |
| 2016/0321983 A1* | 11/2016 | Kim | G09G 3/2092 |

* cited by examiner

EXTENDING ASYNCHRONOUS FRAME UPDATES WITH FULL FRAME AND PARTIAL FRAME NOTIFICATIONS

TECHNICAL FIELD

Embodiments described herein generally relate to sending frame updates to a display panel and particularly to providing information to the display panel about the updates.

BACKGROUND

Display panels receive "frames" including indications of pixel data to be displayed from an image source. Typically, frames are communicated from the source periodically, where the period may be coincident with the refresh rate of the display. Often, the frame may not change from period to period. Said differently, pixel data may be static for several frames. In such cases, the display panel can reduce its refresh rate and/or self-refresh by caching a copy of the frame and refreshing the display electronics from the cached copy of the frame.

DETAILED DESCRIPTION

The present disclosure is generally directed to distinguishing between full frame updates and partial frame updates and to notifying a panel of the expected frame updates. In general, the present disclosure provides for communicating a command during a vertical blanking interval to indicate to a panel the type of frame updates. For example, an image source can send to a sink, during a vertical blanking period, an indication that either a full or a partial frame update is in the frame update pipeline. With some examples, such a signal or command can be sent where frame updates are pending. As such, the lack of such a command after a pre-determined number of lines in the vertical blanking interval may be interpreted as no change in frame content. Based on either receiving the command or inferring that no updates are pending (based on not receiving the command) the panel may implement power saving techniques (e.g., related to self-refresh, power gating electronics, or the like).

Conventional solutions to adaptive frame updates do not provide for partial frame updates. Furthermore, conventional solutions do not provide for notifying the panel of the update and/or type of update. It is noted, that differentiation between full and partial frame updates may provide several advantages. For example, in the case of partial frame updates, the panel may handle the frame update differently from a full frame update to reduce visual tears resulting from the partial update. As another example, the panel may provide various power management operations (e.g., based on resume latencies of the panel). Furthermore, the panel may power up and/or warm up the display based on notifications of updates. Provided herein are systems, display panel and source circuitry, and techniques to provide notification to the display panel of the type of frame update and/or information about the frame updates.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include elements in alternate topologies as desired for a given implementation. It is worthy to note that any reference to "one embodiment" or "an embodiment" means that a feature, structure, or characteristic described relating to the embodiment is included in at least one embodiment. The appearances of the phrases "in one embodiment," "in some embodiments," and "in various embodiments" in various places in the specification are not necessarily all referring to the same embodiment.

Figure 1:
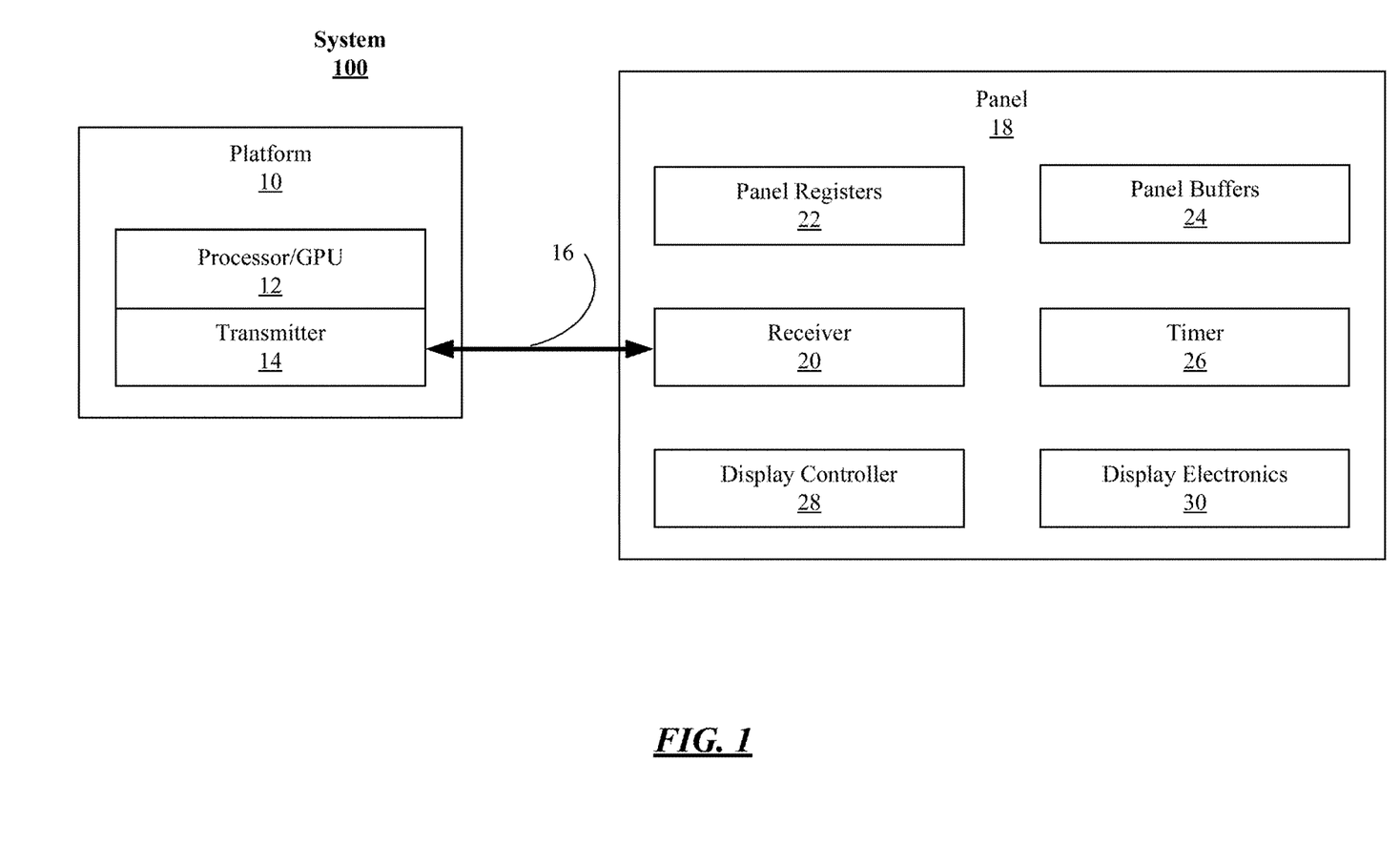
FIG. 1 illustrates an embodiment of a display system.

FIG. 1 illustrates a display system 100, arranged according to at least one embodiment of the disclosure. As depicted, the display system 100 includes a platform 10 and a panel 18 coupled by a display interface 16. In general, the platform 10 can comprise any platform arranged to generate images to be displayed by the panel 18. For example, the platform 10 could be integrated into, part of, or comprise, a laptop computer, a desktop computer, an ultrabook, a cellular telephone, or any processor-based device. In general, panel 18 can be integrated into, part of, or comprise, any of a variety of displays, such as, light emitting diode (LED) displays, organic LED (OLED) displays, liquid crystal displays (LCD), or the like. Display interface 16 may be any of a variety of display interfaces, such as, for example, a display port interface, an embedded display port interface, a high-definition multimedia interface (HDMI), or the like.

The platform 10 may have a processing unit 12, which can be a conventional processor, a graphics processing unit (GPU) or a combination of conventional processor and GPU. Platform 10 further includes a transmitter 14. Processor 12 and transmitter 14 may constitutes a display engine. Platform 10 may be provided as a System-on-Chip (SoC), such as may be integrated into a display system device (e.g., mobile phone, laptop, portable media device, etc.). In general, platform 10 sends images for display by panel 18 via display interface 16. For example, platform 10 can send, via transmitter 14 and display interface 16, information elements including indications of pixel data (e.g., color, locations, etc.) generated by GPU 12 to panel 18. Such information elements (or "frames") often sent at intervals corresponding to a frame rate of panel 18. This is described in greater detail below.

Panel 18 may include a receiver 20, panel registers 22, panel buffers 24, timer 26, display controller 28 and display electronics 30. In general, panel 18 can receive frames (e.g., from platform) at receiver 20 via display interface 16. Receiver 20 can provide the frames to display controller 28, which in turn, provides the frames for display on display electronics 28. Receiver 20 and/or display electronics may have access to panel registers 22, which may store indications of settings for panel 18 (e.g., refresh rate, etc.). Timer 24 can be coupled to receiver 20 and/or display controller 28 and can operate to provide an expiration of a frame refresh interval, or expiation of a period where the display interface 16 link is shut down to conserve power, for example, when the panel 18 is operating in a self-refresh mode, sometimes referred to as panel self-refresh (PSR).

Panel buffer 24 provides memory storage for frames received via display interface 16. Display controller 28 can operate to shut down portions of panel (e.g., receiver, or the like) during periods of PSR and can refresh display electronics from indications of the frame stored in panel buffers 24.

During operation, frames (e.g., corresponding to images to be displayed) are sent by the platform 10 to panel 18 at various intervals (typically corresponding to the refresh rate of the panel 18). A spacing interval, referred to as a vertical blanking interval (VBI or VBLANK) is disposed between each frame. More particularly, a VBI is a period between the end of the final line of a frame or field and the beginning of the first line of the next frame or field.

The present disclosure provides that the platform 10 can communicate information regarding future frame updates to the panel 18 during the VBI. For example, during operation, the transmitter 14 may send to receiver 20 information indicating that either a full frame update is in the pipeline or that a partial frame update is in the pipeline. Furthermore, platform 10 may send information to panel 18 indicating the number of full frames to be updated or the number of update blocks of a partial frame update and information about each block (e.g., beginning and ending pixels, or the like). With some examples, platform 10 may send an indication to panel 18 that a synchronization frame is to be sent (e.g., during a period where not frame updates are pending) to synchronize the timing between the platform 10 and the panel 18, for example, to reduce tears resulting from decoupling the timings during periods of self-refresh, or the like.

FIGS. 2-5 depict example techniques 200 to 500, respectively, in which a sink can notify a source of future frame updates and/or coordinate panel synchronization. Each of these figures depicts several frames 220, each having various labels. For example, a frame may be labeled "Frame N" or "Partial Frame N'" or the like. Where a frame is labeled with the same identification (e.g., "Frame N+1") it indicates the frames are identical in term of pixel content even though the timestamps might be different. Additionally, where a frame is labeled with an apostrophe, it indicates the frame is a partial update. In general, each frame is surrounded by a VBI 210.

It is to be appreciated, that a limited number and arrangement of frames is depicted in these figures. However, these techniques could be implemented with different numbers and/or configurations of frames than depicted without departing from the scope of the disclosure.

It is noted that these figures are depicted and described with reference to the system 100 of FIG. 1. More specifically, these figures describe operations and interactions between a sink (e.g., platform 10) and a source (e.g., panel 18). However, these techniques may be implemented by a sink and source different than that depicted in FIG. 1.

Figure 2:
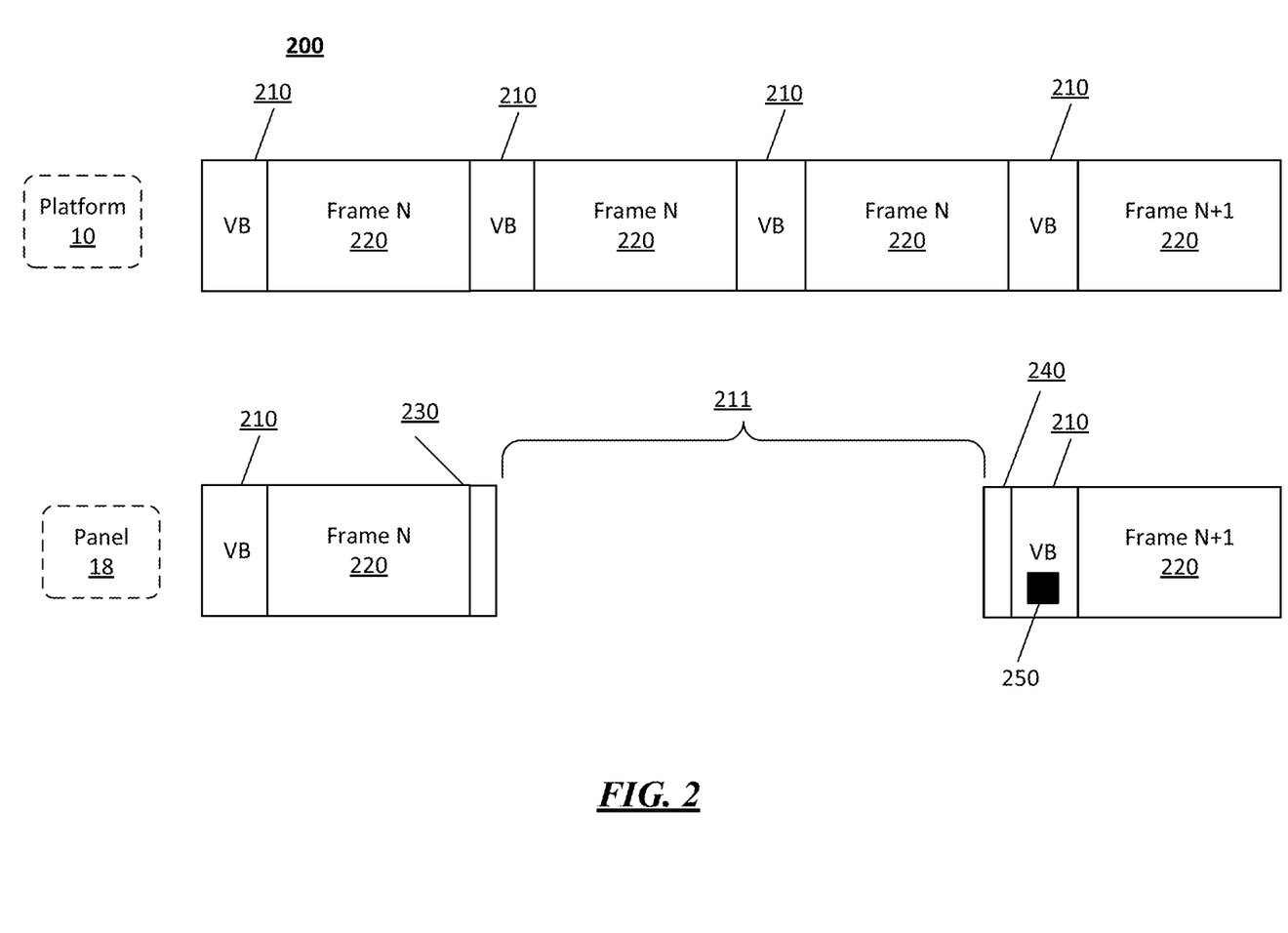
FIG. 2 illustrates a first example technique.

Turning more specifically to FIG. 2 and technique 200. Technique 200 may be implemented to provide a stretched VBI 211 to facilitate power management features. For example, a link (e.g., link 16) between the sink and source may be powered down during the stretched VBI 211. To provide the stretched VBI, the platform 10 may send a frame 220 (e.g., Frame N) with a preselected hold time 230 (e.g., 2-8 lines) to indicate to the source that the next VBI is a stretched VBI 211. With some examples, the stretched VBI 211 can correspond to the lowest refresh rate of the panel 18. In other examples, the stretched VBI 211 may be longer that the lowest refresh rate of the panel 18 and the panel 18 may self-refresh (e.g., from panel buffers 24, or the like) during a stretched VBI 211. With some examples, platform 10 can send frame 220 to panel 18 with a hold time selected to indicate the duration of the stretched VBI 211.

At the end of the stretched VBI 211, the link 16 can be powered back up and synchronized 240. For example, link 16 can be synchronized based on a fast link training (FLT) method, or the like. During the VBI 210 following the stretched VBI 211, the source can indicate to the sink information about the following frame update (e.g., type of update, details of the update, or the like). For example, platform 10 can notify panel 18 that frame 220 (e.g., Frame N+1) is a full frame update.

As a specific example, platform 10 can indicate to panel 18 information regarding frame updates via an existing configuration channel within link 16. For example, display port links include an AUX channel, which the platform 10 could use to indicate (e.g., via a control signal, via an information element, via selected symbol or symbol(s), or the like) to the panel 18 that the frame update is a full frame update. Furthermore, platform 10 may indicate to panel 18 the number of consecutive full frame updates (e.g., 2, 3, 4, etc.). As such, panel 18 may coordinate and/or schedule power management features based on the number of consecutive full frame updates indicated by platform 10.

Figure 3:
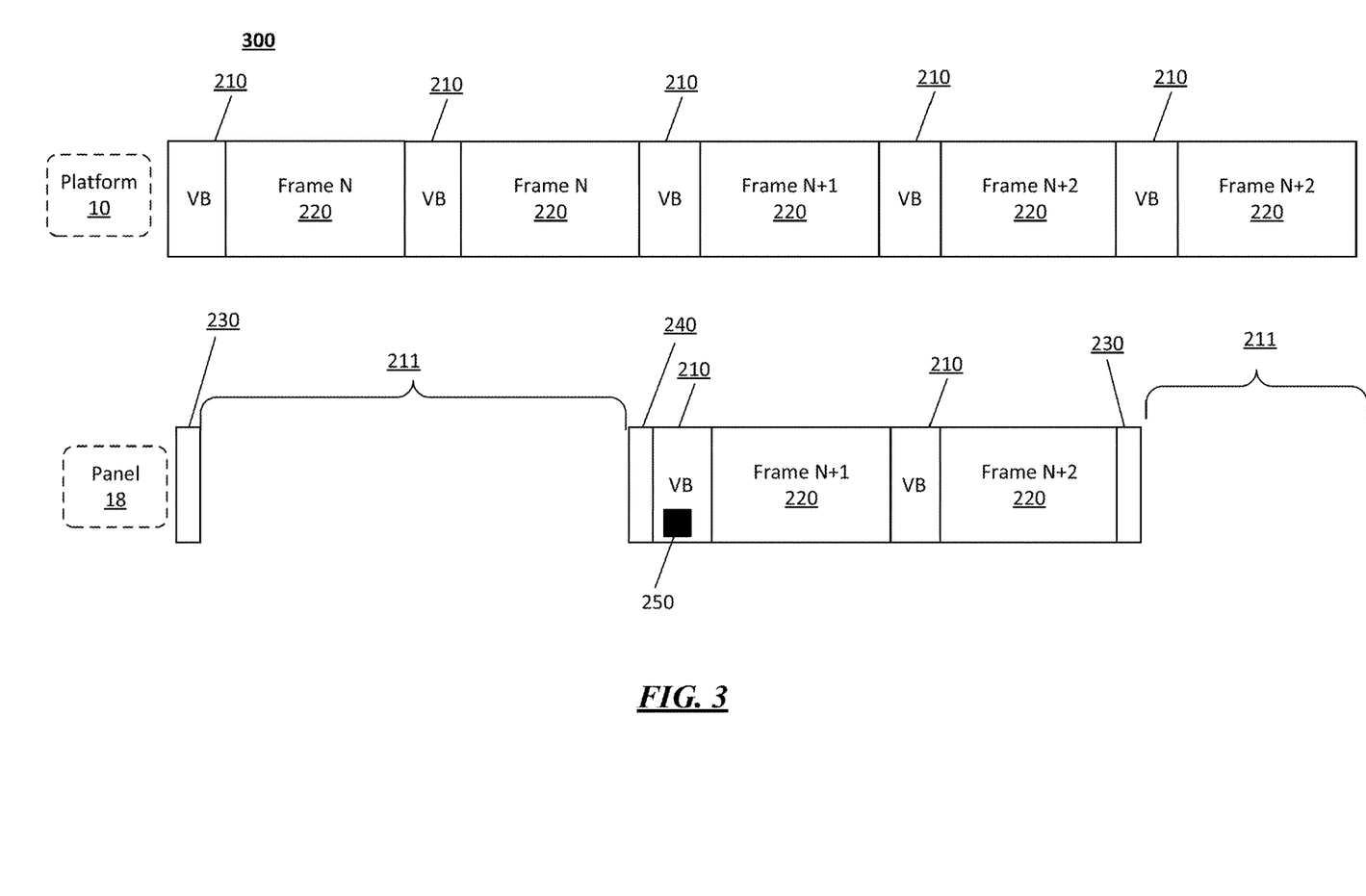
FIG. 3 illustrates a second example technique.

For example, FIG. 3 depicts technique 300 in which platform 10 indicates to panel 18 that 2 consecutive full frame updates are pending. As such, panel 18 can schedule to shutdown link 16 and/or other associated panel electronics during stretched VBIs 211. Specifically, this figure depicts frames 220 and VBIs 211, corresponding to a normal frame schedule. A frame 220 (e.g., frame N) may be sent to panel 18 along with a select number of hold lines 230 to indicate a stretched VBI 211 follows the frame 220, or to indicate that no frame updates follow the frame. The link (e.g., link 16) between the source and sink may be shut down at the beginning of the stretched VBIs 211 and may be brought back up (e.g., with FLT 240, or the like) at the end of the stretched VBIs 211.

Platform 10 may notify panel 18 of the type of frame update (e.g., full frame update) and the number of consecutive frame updates during a VBI 210 preceding a frame update (e.g., VBI 210 preceding frame N+1 update, or the like). For example, platform 10 can notify panel 18 of the type and number of frame updates by sending selected symbols or commands in-band during a VBI 210.

Figure 4:
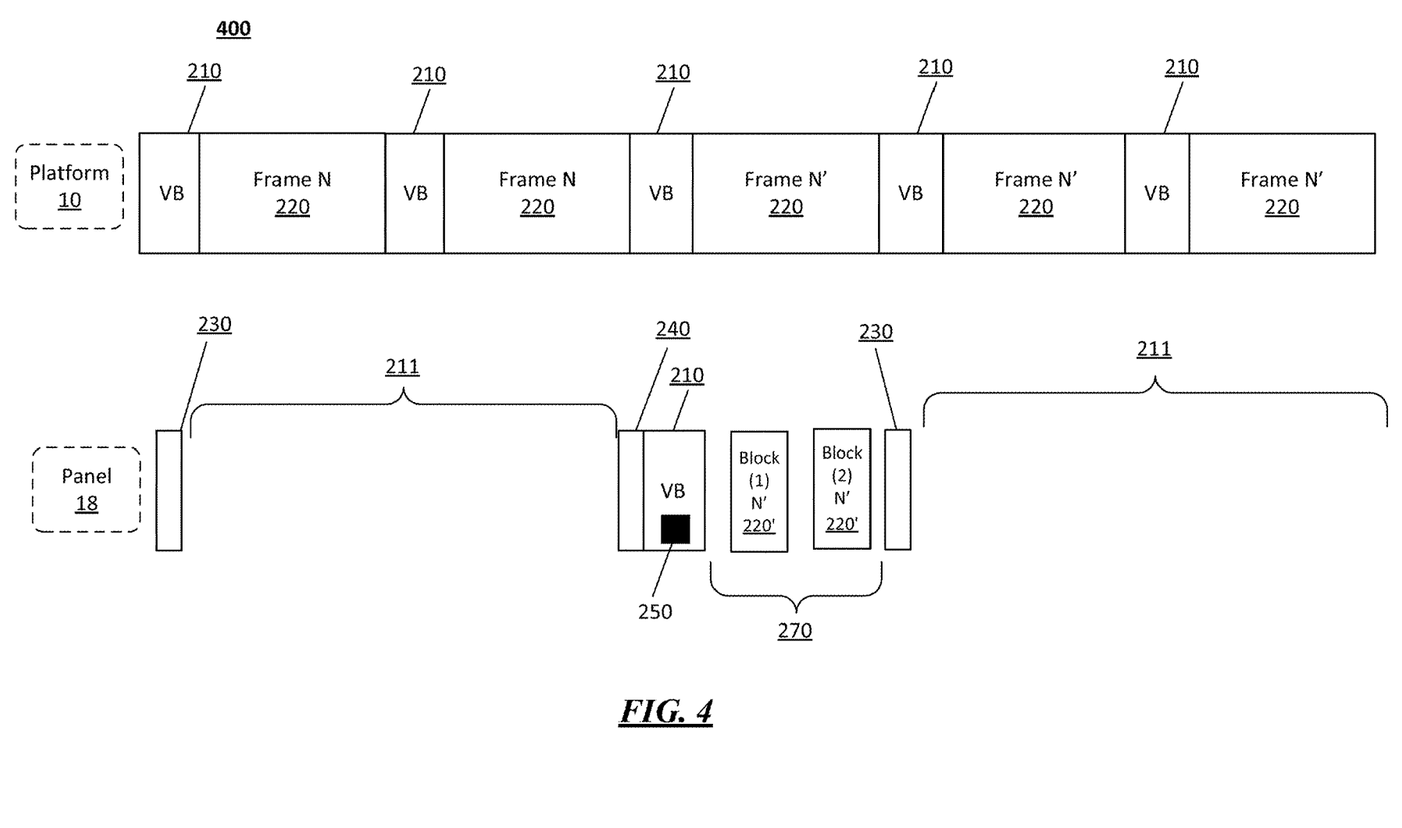
FIG. 4 illustrates a third example technique.

Turning more specifically to FIG. 4 and technique 400, in which platform 10 indicates to panel 18 that a partial frame update is pending. For example, "Frame N'" is a partial update to "Frame N". It is noted, that panels in which frame buffers are disposed may provide for partial updates to a frame. For example, panel 18 may store frame n in panel buffers 24. Platform 10 can send partial updates (e.g., frame n') to panel 18 and the contents (e.g., pixels) of frame stored in panel buffers 24 updated accordingly. The panel 18 can schedule power management features based on notification from the platform 10 of the partial update and/or details of the partial update (e.g., number of update blocks, starting and ending pixels for each block, etc.). For example, the platform may avoid prematurely power gating panel electronics based on the notification of the partial update.

This figure, like prior figures, depicts frames 220 and VBIs 211, corresponding to a normal frame schedule. A frame 220 (e.g., frame N) may be sent by the platform 10 to the panel 18 along with a select number of hold lines 230 to indicate a stretched VBI 211 follows the frame 220, or to indicate that no frame updates follow the frame 200. The link (e.g., link 16) between the source and sink may be shut down at the beginning of the stretched VBIs 211 and may be brought back up (e.g., with FLT 240, or the like) at the end of the stretched VBIs 211.

Platform 10 may notify panel 18 of the type of frame update (e.g., partial frame update) and information about the frame update (e.g., number of update blocks, starting and ending pixels for each block, etc.) during a VBI 210 before the partial update. For example, platform 10 can notify panel 18 of the partial update (e.g., frame n') by sending selected symbols or commands 250 in-band during VBI 210.

The platform can then send to the panel, via the link between the platform and panel, data associated with the partial frame update. For example, platform 10 can send to panel 18 via link 16 partial frame update blocks 270.

Figure 5:
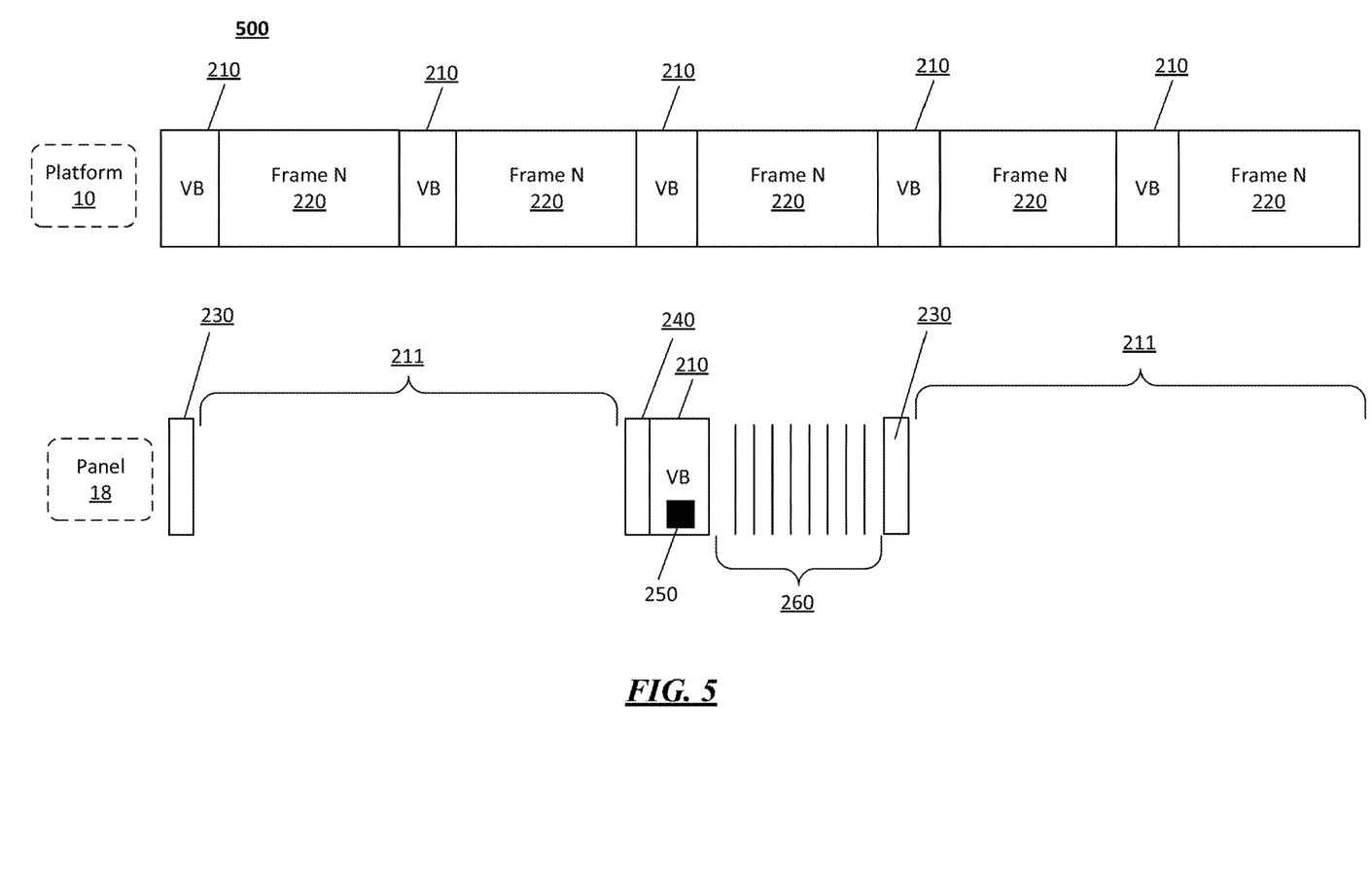
FIG. 5 illustrates a fourth example technique.

During operation, the timing between platform 10 and panel 18 may be decoupled. For example, during stretched VBIs 211, panel 18 can operate on timing independently from platform 10 (e.g., based on timer 26, or the like). As such, visual artifacts (e.g., tearing, or the like) may manifest due to drift between the timing of the platform 10 and the timing of the panel 18. The present disclosure provides for periodic synchronization between the platform 10 and the panel 18 to reduce introduction of such visible artifacts. Conventionally, the platform 10 and panel 18 would repeatedly power up during periods of no frame updates to send a repeat frame to maintain synchronization. The present disclosure provides for sending synchronization symbols and/or synchronization data from the platform to the panel to maintain synchronization. The present disclosure provides that the platform 10 can notify the panel 18 that synchronization data is to follow a VBI 210 based on indications 250 during the VBI 210. As such, the platform and panel can retain at least some of the power saving features as they are not required to utilize the entire frame generating and decoding circuitry within the platform 10 and panel 18 to maintain synchronization.

For example, FIG. 5 depicts technique 500 in which platform 10 indicates to panel 18 that synchronization symbols are to be transmitted. Specifically, platform 10 can indicate via assertion of a command or symbols 250 during VBI 210 that synchronization symbols 260 are to be transmitted after the VBI 210. As such, platform 10 and panel 18 can synchronize their timing based on the synchronization symbols 260. In some examples, synchronization symbols 260 can be selected symbols transmitted in a known arrangement to provide timing synchronization between the platform 10 and panel 18. In some examples, synchronization symbols 260 can be dummy data transmitted to provide timing synchronization between the platform 10 and panel 18. It is noted, that the synchronization symbols may have no relationship or bearing on frames 220 or data indicated by frames 220, but are instead transmitted to provide timing synchronization without necessitating encoding and encoding image data from frames 220.

Figure 6:
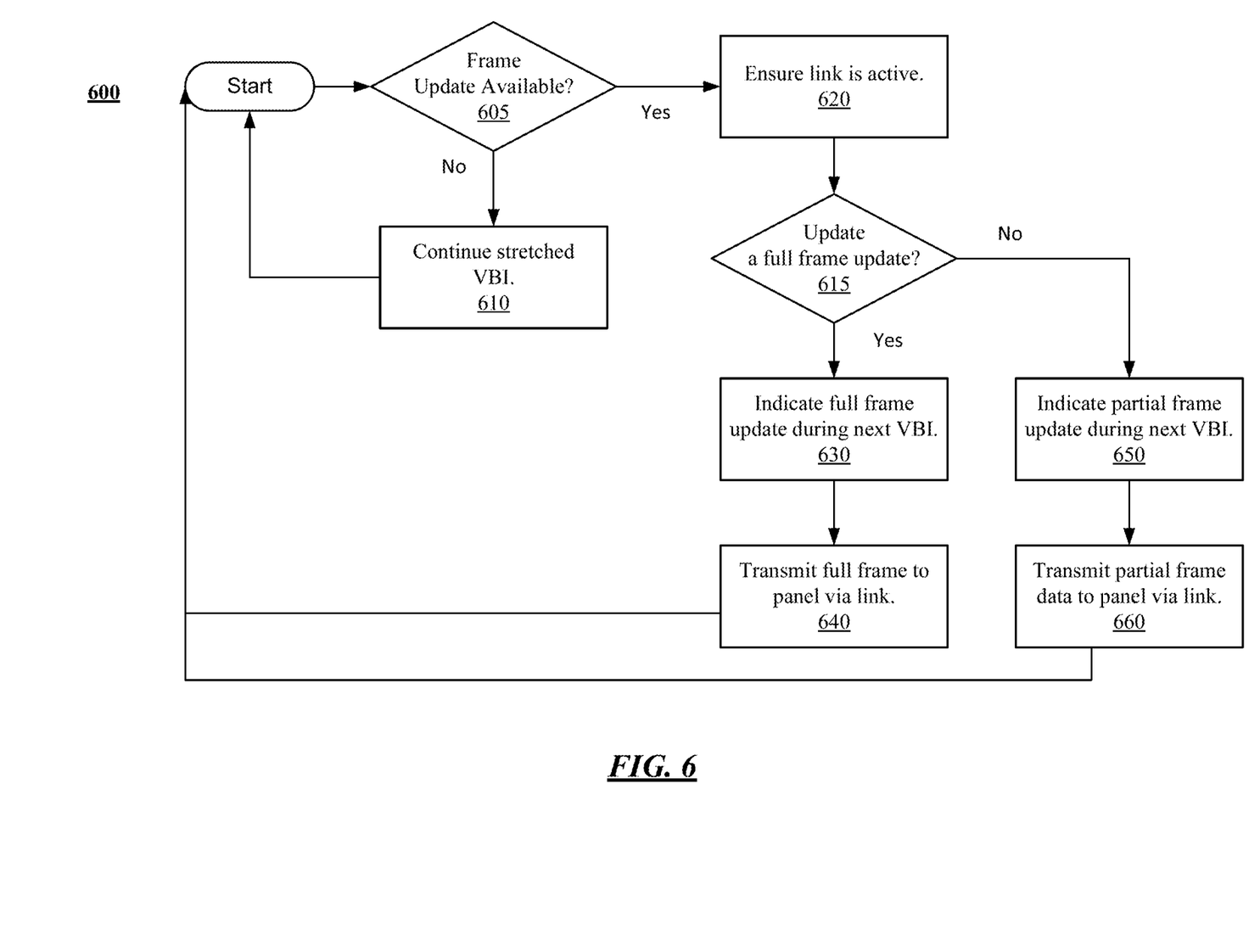
FIG. 6 illustrates a first example logic flow.

FIG. 6 illustrates a logic flow 600 for communicating an indication of a type of frame update and/or information associated with a frame update. Logic flow 600 can be implemented by a platform coupled to a panel, such as, for example, platform 10 coupled to panel 18. Logic flow 600 can begin at decision block 605. At decision block 650 "frame updates available?" the platform can determine whether frame updates are available. For example, platform 10 can determine whether updated frames 220 are available to transmit to panel 18. From decision block 605, logic flow 600 can continue to either block 610 or block 620. For example, logic flow 600 can continue from decision block 605 to block 610 based on a determination that no new frame updates are available. Conversely, logic flow 600 can continue from decision block 605 to block 620 based on a determination that frame updates are available to transmit to the panel.

At block 610 "continue stretched VBI" the platform can continue the stretched VBI. For example, platform 10 can continue stretched VBI 211 by not activating link 16. At block 620 "ensure link is active" the platform can ensure that the link between the platform and panel is active. For example, platform 10 can ensure link 16 is active. In some examples, at block 620, platform 10 can activate link 16 via a FLT procedure.

Continuing from block 620 to decision block 615 "update a full frame update?" the platform can determine whether the update is a full frame update (or a partial frame update). For example, platform 10 can determine whether frame 220 is a full update to the prior frame (e.g., frame n+1, or the like) or a partial update to the prior frame (e.g., frame n', or the like). From decision block 615, logic flow 600 can continue to either block 630 or block 650. For example, logic flow 600 can continue from decision block 615 to block 630 based on a determination that frame update is a full frame update. Conversely, logic flow 600 can continue from decision block 615 to block 650 based on a determination that frame update is not a full frame update.

At block 630 "indicate full frame update during next VBI" the platform can indicate to the panel that the next update is a full frame update. For example, platform 10 can indicate to panel 18 during VBI 210 (e.g., using symbols 250, or the like) that the frame update is a full frame update. Continuing to block 640 "transmit full frame to panel via link" the platform can transmit the full frame update to the panel via the link between the platform and panel. For example, platform 10 can transmit to panel 18, via link 16, the full frame update 220.

At block, 650 "indicate partial frame update during next VBI" the platform can indicate to the panel that the next update is a partial frame update. For example, platform 10 can indicate to panel 18 during VBI 210 (e.g., using symbols 250, or the like) that the frame update is a partial frame update. Continuing to block 660 "transmit partial frame data to panel via link" the platform can transmit the data associated with the partial frame update to the panel via the link between the platform and panel. For example, platform 10 can transmit to panel 18, via link 16, the partial frame update blocks 270.

Figure 7:
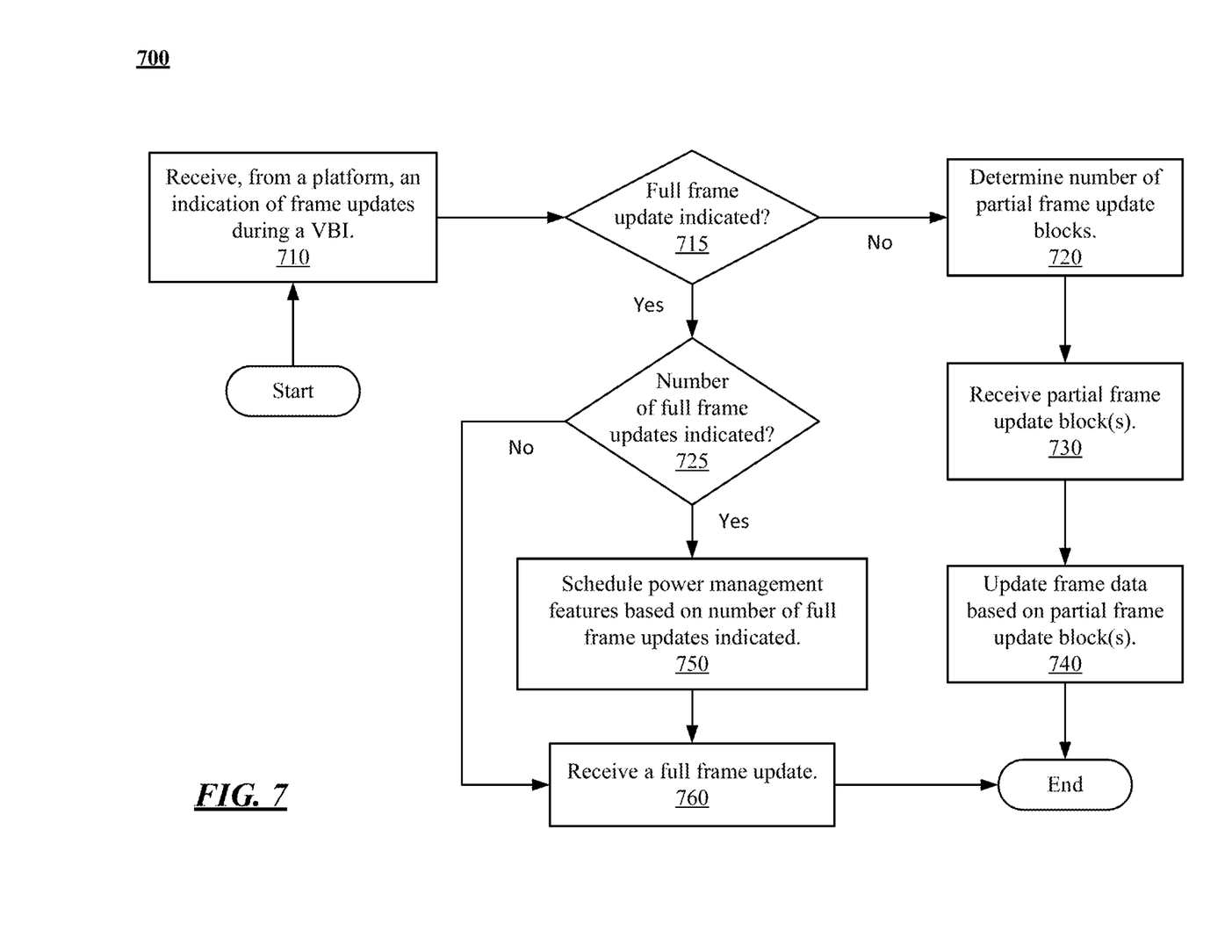
FIG. 7 illustrates a second example logic flow.

FIG. 7 illustrates a logic flow 700 for receiving an indication of a type of frame update and/or information associated with a frame update. Logic flow 700 can be implemented by a panel coupled to a platform, such as, for example, panel 18 coupled to platform 10. Logic flow 700 can begin at block 710 "receive, from a platform, an indication of frame updated during a VBI" a panel can receive from a platform an indication of frame updates during a VBI. For example, panel 18 can receive from platform 10 indications 250 of frame updates during a VBI 210. Continuing to decision block 715. At decision block 715 "full frame update indicated?" the panel can determine whether a full frame update (or a partial frame update) was indicated. For example, panel 18 can determine whether the platform 10 indicated (e.g., via symbols 250, or the like) that the frame update 220 is a full update to the prior frame (e.g., frame n+1, or the like) or a partial update to the prior frame (e.g., frame n', or the like). From decision block 715, logic flow 700 can continue to either block 720 or decision block 725. For example, logic flow 700 can continue from decision block 715 to block 720 based on an indication that the frame update is not a full frame update. Conversely, logic flow 700 can continue from decision block 715 to decision block 725 based on an indication that the frame update is a full frame update.

At block 720 "determine number of partial frame update blocks" the panel can determine the number of partial frame update blocks. For example, panel 18 can determine the number of partial frame update block 270 from indication 250. Continuing to block 730 "receive partial frame update block(s)" the panel can receive a partial frame update block from the platform. For example, panel 18 can receive partial frame update blocks 270 after the VBI 210 in which partial frame update was indicated. Continuing to block 740 "update frame data based on partial frame update block(s)" the panel can update based on the partial frame update block(s). For example, the panel can refresh the displayed image based on the partial frame update blocks and/or cached frame data. For example, a complete image can be refreshed based on the partial updates and a full frame cache. In some examples, the panel 18 can replace portions of the cached frame with the partial frame update data.

At decision block 725 "number of full frame updates indicates?" the panel can determine whether several full frame updates were indicated by the platform. For example, panel 18 can determine whether platform 10 indicated (e.g., at 250) how many full frame updates are ready. From decision block 725, logic flow 700 can continue to either block 750 or block 760. For example, logic flow 700 can continue from decision block 725 to block 750 based on an indication that multiple full frame updates are available. Conversely, logic flow 700 can continue from decision block 725 to decision block 760 based on no indication of multiple full frame updates.

At block 750 "schedule power management features based on the number of full frame updates indicated" the panel can schedule power management functions (e.g., power gating electronics, self-refresh, etc.) based on the number of full frame updates indicated by the platform in VBI 210. Logic flow 700 can continue from block 750 to block 760. At block 760 "receive a full frame update" the panel can receive a full frame update from the platform. For example, panel 18 can receive full frame update 220 from platform 10 via link 16.

Figure 8:
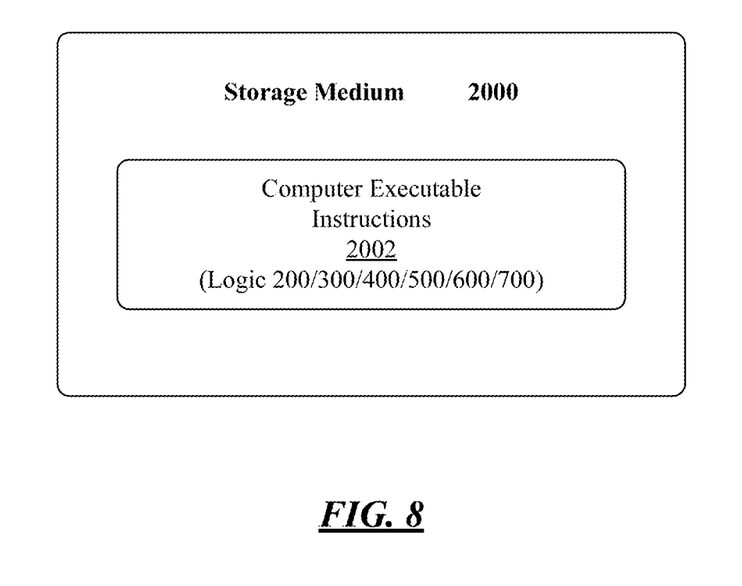
FIG. 8 illustrates one embodiment of a storage medium.

FIG. 8 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). The storage medium 2000 may store various types of computer executable instructions to implement technique 200. The storage medium 2000 may store various types of computer executable instructions to implement technique 300. The storage medium 2000 may store various types of computer executable instructions to implement technique 400. The storage medium 2000 may store various types of computer executable instructions to implement technique 500. The storage medium 2000 may store various types of computer executable instructions to implement logic flow 600. The storage medium 2000 may store various types of computer executable instructions to implement logic flow 700.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
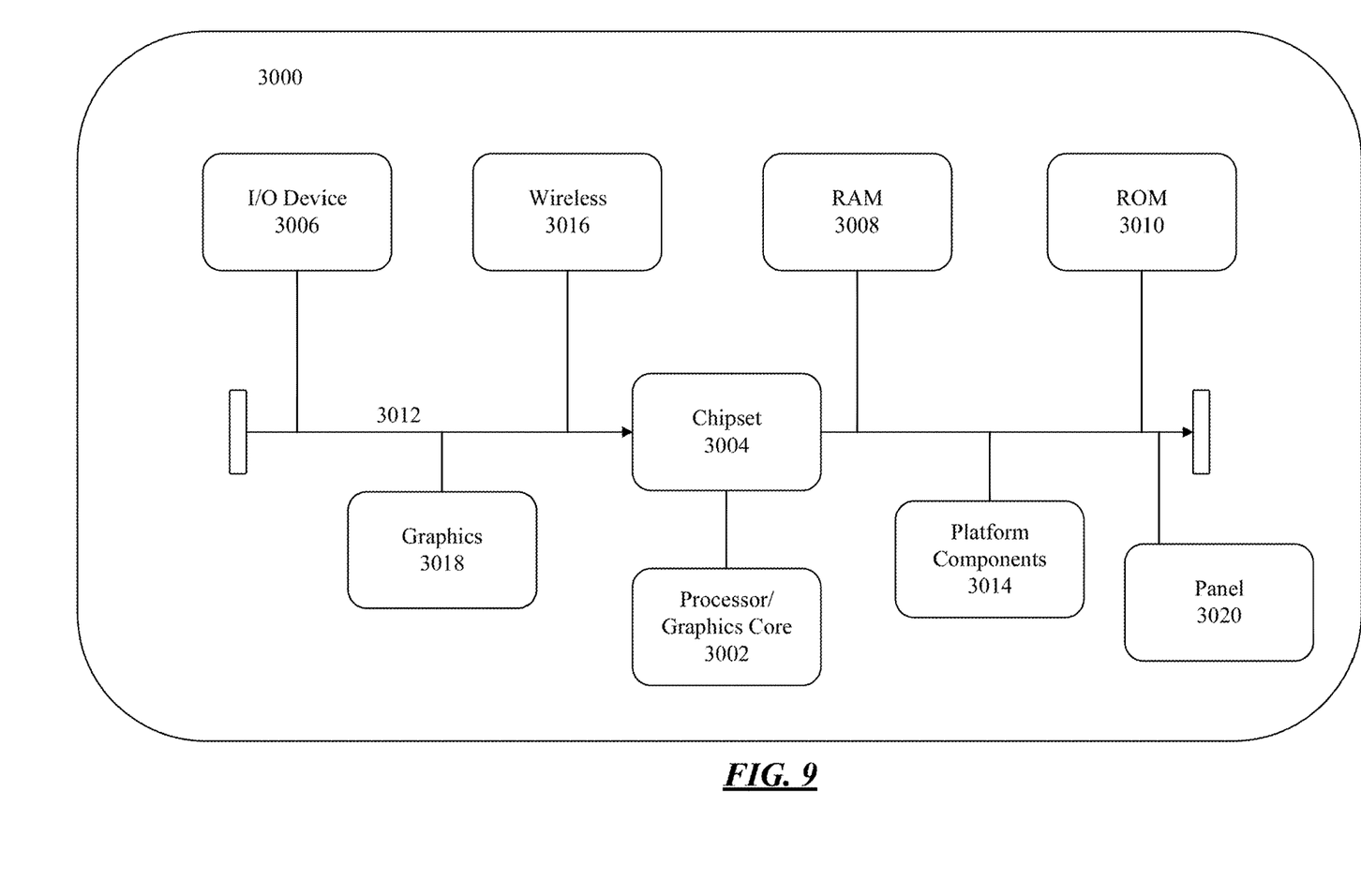
FIG. 9 illustrates one embodiment of a device.

FIG. 9 is a diagram of an exemplary system embodiment and, depicts a platform 3000, which may include various elements. For instance, this figure depicts that platform (system) 3000 may include a processor/graphics core 3002, a chipset 3004, an input/output (I/O) device 3006, a random-access memory (RAM) (such as dynamic RAM (DRAM)) 3008, and a read only memory (ROM) 3010, panel 3020 (e.g., panel 18, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a feature, structure, or characteristic described relating to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1. An apparatus, comprising: a transmitter to send a frame update to a panel via a display interconnect; and a processor coupled to the transmitter, the processor to cause the transmitter to send, during a vertical blanking interval (VBI), an information element to the panel, the information element to include an indication of a frame update.

Example 2. The apparatus of example 1, the processor to determine whether the frame update is a full frame update or a partial frame update.

Example 3. The apparatus of example 2, the processor to cause the transmitter to send, during the VBI, the information element including an indication that the frame update is a full frame update based on a determination that the frame update is a full frame update.

Example 4. The apparatus of example 3, the processor to determine a number full frame updates.

Example 5. The apparatus of example 4, the processor to cause the transmitter to send, during the VBI, the information element including an indication of the determined number of full frame updates.

Example 6. The apparatus of example 2, the processor to cause the transmitter to send, during the VBI, the information element including an indication that the frame update is a partial frame update based on a determination that the frame update is a partial frame update.

Example 7. The apparatus of example 6, the processor to cause the transmitter to send, during the VBI, the information element including an indication of attributes of the partial frame update.

Example 8. The apparatus of example 7, the attributes comprising at least one of a number of partial frame update blocks or a starting and ending pixel of the partial frame update.

Example 9. The apparatus of example 1, comprising a display interface coupled to the transmitter, the display interface to couple to the display interconnect.

Example 10. The apparatus of example 9, the display interface comprising a display port interface or an embedded display port interface.

Example 11. A method comprising: sending, from an image source to an image sink during a vertical blanking interval (VBI), an information element including an indication of a frame update; and sending, from the image source to the image sink, the frame update.

Example 12. The method of example 11, comprising determining whether the frame update is a full frame update or a partial frame update.

Example 13. The method of example 12, comprising sending, during the VBI, the information element including an indication that the frame update is a full frame update based on a determination that the frame update is a full frame update.

Example 14. The method of example 13, comprising determining a number full frame updates.

Example 15. The method of example 14, comprising sending, during the VBI, the information element including an indication of the determined number of full frame updates.

Example 16. The method of example 12, comprising sending, during the VBI, the information element including an indication that the frame update is a partial frame update based on a determination that the frame update is a partial frame update.

Example 17. The method of example 12, comprising sending, during the VBI, the information element including an indication of attributes of the partial frame update.

Example 18. The method of example 17, the attributes comprising at least one of a number of partial frame update blocks or a starting and ending pixel of the partial frame update.

Example 19. At least one machine-readable storage medium comprising instructions that when executed by a processor at a platform coupled to a panel via a display interconnect, cause the processor to: send, to the panel via the display interconnect during a vertical blanking interval (VBI), an information element to the panel, the information element to include an indication of a frame update; and send, to the panel via the display interconnect, the frame update.

Example 20. The at least one machine-readable storage medium of example 19, comprising instructions that further cause the processor to determine whether the frame update is a full frame update or a partial frame update.

Example 21. The at least one machine-readable storage medium of example 20, comprising instructions that further cause the processor to, based on a determination that the frame update is a full frame update: determine a number of full frame updates; send, during the VBI, the information element including an indication that the frame update is a full frame update and an indication of the determined number of full frame updates.

Example 22. The at least one machine-readable storage medium of example 20, comprising instructions that further cause the processor to send, during the VBI, the information element including an indication that the frame update is a partial frame update based on a determination that the frame update is a partial frame update.

Example 23. The at least one machine-readable storage medium of example 22, comprising instructions that further cause the processor to send, during the VBI, the information element including an indication of attributes of the partial frame update.

Example 24. The at least one machine-readable storage medium of example 23, the attributes comprising at least one of a number of partial frame update blocks or a starting and ending pixel of the partial frame update.

Example 25. The at least one machine-readable storage medium of example 19, the display interface comprising a display port interface or an embedded display port interface.

Example 26. An apparatus comprising: means to send, from an image source to an image sink during a vertical blanking interval (VBI), an information element including an indication of a frame update; and means to send, from the image source to the image sink, the frame update.

Example 27. The apparatus of example 26, comprising means to determine whether the frame update is a full frame update or a partial frame update.

Example 28. The apparatus of example 27, comprising means to send, during the VBI, the information element including an indication that the frame update is a full frame update based on a determination that the frame update is a full frame update.

Example 29. The apparatus of example 28, comprising means to determine a number full frame updates.

Example 30. The apparatus of example 29, comprising means to send, during the VBI, the information element including an indication of the determined number of full frame updates.

Example 31. The apparatus of example 27, comprising means to send, during the VBI, the information element including an indication that the frame update is a partial frame update based on a determination that the frame update is a partial frame update.

Example 32. The apparatus of example 31, comprising means to send, during the VBI, the information element including an indication of attributes of the partial frame update.

Example 33. The apparatus of example 32, the attributes comprising at least one of a number of partial frame update blocks or a starting and ending pixel of the partial frame update.

Example 34. A system comprising: a panel; and a platform coupled to the panel via a display interconnect, the platform comprising: a transmitter to send a frame update to the panel via the display interconnect; and a processor coupled to the transmitter, the processor to cause the transmitter to send, during a vertical blanking interval (VBI), an information element to the panel, the information element to include an indication of a frame update.

Example 35. The system of example 34, the processor to determine whether the frame update is a full frame update or a partial frame update.

Example 36. The system of example 35, the processor to cause the transmitter to send, during the VBI, the information element including an indication that the frame update is a full frame update based on a determination that the frame update is a full frame update.

Example 37. The system of example 36, the processor to determine a number full frame updates.

Example 38. The system of example 37, the processor to cause the transmitter to send, during the VBI, the information element including an indication of the determined number of full frame updates.

Example 39. The system of example 35, the processor to cause the transmitter to send, during the VBI, the information element including an indication that the frame update is a partial frame update based on a determination that the frame update is a partial frame update.

Example 40. The system of example 39, the processor to cause the transmitter to send, during the VBI, the information element including an indication of attributes of the partial frame update.

Example 41. The system of example 40, the attributes comprising at least one of a number of partial frame update blocks or a starting and ending pixel of the partial frame update.

Example 42. The system of example 34, comprising a display interface coupled to the transmitter, the display interface to couple to the display interconnect.

Example 43. The system of example 42, the display interface comprising a display port interface or an embedded display port interface.

The invention claimed is:

1. An apparatus, comprising:
   a transmitter to send a frame to a panel via a display interconnect; and
   a processor coupled to the transmitter, the processor to:
   cause the transmitter to send, during a first vertical blanking interval (VBI) following transmission of the frame, an information element to the panel, the information element to include an indication of synchronization symbols to provide timing synchronization between the panel and the transmitter;
   cause the transmitter to send, following the first VBI, a frame update to the panel via the display interconnect;
   determine whether the frame update is a full frame update or a partial frame update; and
   send, during a second VBI, a second information element to the panel, the second information element to include an indication of that the frame update is a full frame update based on a determination that the frame update is a full frame update; or
   send, during the second VBI, a second information element to the panel, the second information element to include an indication of that the frame update is a partial frame update based on a determination that the frame update is a partial frame update.

2. The apparatus of claim 1, wherein the frame update is one of a plurality of full frame updates, the processor to determine a number of full frame updates of the plurality of full frame updates.

3. The apparatus of claim 2, the second information element including an indication of the determined number of full frame updates.

4. The apparatus of claim 1, comprising a display interface coupled to the transmitter, the display interface to couple to the display interconnect.

5. The apparatus of claim 4, the display interface comprising a display port interface or an embedded display port interface.

6. The apparatus of claim 1, wherein the synchronization symbols do not require encoding or decoding by the panel.

7. A method comprising:
   sending, from an image source to an image sink, a frame;
   sending, from the image source to the image sink during a first vertical blanking interval (VBI) following the frame, an information element, the information element to include an indication of synchronization symbols to provide timing synchronization between the image source and the image sink;
   sending, following the first VBI, a frame update from the image source to the image sink;
   determining whether the frame update is a full frame update or a partial frame update; and
   sending, during the VBI, a second information element from the image source to the image sink, the second information element to include an indication of that the frame update is a full frame update based on a determination that the frame update is a full frame update; or
   send, during the VBI, a second information element from the image source to the image sink, the second information element to include an indication of that the frame update is a partial frame update based on a determination that the frame update is a partial frame update.

8. The method of claim 7, wherein the frame update is one of a plurality of full frame updates, the method comprising determining a number full frame updates of the plurality of full frame updates.

9. The method of claim 8, the second information element including an indication of the determined number of full frame updates.

10. The method of claim 7, wherein the synchronization symbols do not require encoding or decoding by the image sink.

11. At least one non-transitory machine-readable storage medium comprising instructions that when executed by a processor at a platform coupled to a panel via a display interconnect and a transmitter, cause the processor to:
send, to the panel via the display interconnect and the transmitter, a frame;
send, to the panel via the display interconnect and the transmitter, during a first vertical blanking interval (VBI) following the sending of the frame, an information element to the panel, the information element to include an indication of synchronization symbols to provide timing synchronization between the panel and the platform;
cause the transmitter to send, following the first VBI, a frame update to the panel via the display interconnect;
determine whether the frame update is a full frame update or a partial frame update; and
send, during the VBI, a second information element to the panel, the second information element to include an indication of that the frame update is a full frame update based on a determination that the frame update is a full frame update; or
send, during the VBI, a second information element to the panel, the second information element to include an indication of that the frame update is a partial frame update based on a determination that the frame update is a partial frame update.

12. The at least one non-transitory machine-readable storage medium of claim 11, wherein the frame update is one of a plurality of full frame updates, comprising instructions that further cause the processor to, based on a determination that the frame update is a full frame update determine a number of full frame updates of the plurality of full frame updates.

13. The at least one non-transitory machine-readable storage medium of claim 12, the second information element including an indication of the determined number of full frame updates.

14. The at least one non-transitory machine-readable storage medium of claim 11, the display interface comprising a display port interface or an embedded display port interface.

15. The at least one non-transitory machine-readable storage medium of claim 11, wherein the synchronization symbols do not require encoding or decoding by the panel.

* * * * *